US009671647B2

(12) United States Patent
Kim et al.

(10) Patent No.: US 9,671,647 B2
(45) Date of Patent: Jun. 6, 2017

(54) CURVED DISPLAY DEVICE

(71) Applicant: Samsung Display Co., Ltd., Yongin, Gyeonggi-Do (KR)

(72) Inventors: Su Jeong Kim, Seoul (KR); Kichul Shin, Seongnam-si (KR); Jae Hoon Jung, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/605,146

(22) Filed: Jan. 26, 2015

(65) Prior Publication Data
US 2015/0277166 A1 Oct. 1, 2015

(30) Foreign Application Priority Data
Mar. 31, 2014 (KR) .................. 10-2014-0037611

(51) Int. Cl.
*G02F 1/1337* (2006.01)
*G02F 1/1343* (2006.01)

(52) U.S. Cl.
CPC .. *G02F 1/133707* (2013.01); *G02F 1/133753* (2013.01); *G02F 2001/133726* (2013.01); *G02F 2001/133761* (2013.01); *G02F 2001/134345* (2013.01)

(58) Field of Classification Search
CPC ......... G02F 1/133707; G02F 1/133753; G02F 2001/133761; G02F 2001/134345; G02F 2001/133726; G02F 2001/133749
See application file for complete search history.

(56) References Cited

U.S. PATENT DOCUMENTS

| 6,201,588 B1* | 3/2001 | Walton ............. G02F 1/133711 349/123 |
| 7,386,161 B2 | 6/2008 | Weiss et al. |
| 7,956,970 B2 | 6/2011 | Yamaguchi et al. |
| 7,986,377 B2 | 7/2011 | Kim et al. |
| 2010/0060838 A1* | 3/2010 | Kim ................. G02F 1/134309 349/141 |

(Continued)

FOREIGN PATENT DOCUMENTS

JP 2002214613 A 7/2002
JP 3422938 B2 4/2003

(Continued)

*Primary Examiner* — Nathanael R Briggs
(74) *Attorney, Agent, or Firm* — Cantor Colburn LLP

(57) ABSTRACT

A curved display device includes: a display substrate curved along a first direction; an opposing substrate coupled with the display substrate and curved together with the display substrate; and a liquid crystal layer including liquid crystal molecules interposed between the display substrate and the opposing substrate, where the opposing substrate includes: a common electrode; and a first alignment layer disposed on the common electrode and which aligns a first portion of the liquid crystal molecules at a first pre-tilt angle, and the display substrate includes: a pixel electrode disposed in each of a plurality of pixel areas, where a slit is defined in the pixel electrode; and a second alignment layer disposed on the pixel electrode and which aligns a second portion of the liquid crystal molecules at a second pre-tilt angle, which is greater than the first pre-tilt angle.

15 Claims, 16 Drawing Sheets

(56) References Cited

U.S. PATENT DOCUMENTS

| | | | |
|---|---|---|---|
| 2010/0182556 A1* | 7/2010 | Oh | G02F 1/133707 349/127 |
| 2011/0157531 A1* | 6/2011 | Suwa | G02F 1/133788 349/124 |
| 2011/0255039 A1* | 10/2011 | Enomoto | G02F 1/133305 349/113 |
| 2013/0155357 A1* | 6/2013 | Ota | G02F 1/133512 349/110 |

FOREIGN PATENT DOCUMENTS

| | | | |
|---|---|---|---|
| JP | 2006154220 A | 6/2006 |
| JP | 2010097226 A | 4/2010 |
| KR | 100453364 B1 | 10/2004 |

\* cited by examiner

First Line Tilt Angle = 1°
Second Line Tilt Angle = 1°

First Line Tilt Angle = 0.5°
Second Line Tilt Angle = 1°

First Line Tilt Angle = 0.2°
Second Line Tilt Angle = 1°

First Line Tilt Angle = 0°
Second Line Tilt Angle = 1°

CURVED DISPLAY DEVICE

This application claims priority to Korean Patent Application No. 10-2014-0037611, filed on Mar. 31, 2014, and all the benefits accruing therefrom under 35 U.S.C. §119, the contents of which in their entireties are herein incorporated by reference.

BACKGROUND

1. Field

The disclosure herein relates to a curved display device, and more particularly, to a curved display device having a display area of a curved form.

2. Description of the Related Art

Display device are applied to various devices such as TVs, monitors, notebook computers, and mobile phones and display images. Recently, a curved display device is applied to the devices and provides a curved display area curved along a direction. The curved display device includes the curved display areas such that the curved display device provides images with improved three-dimensional, immersive, and intense effects to a viewer.

SUMMARY

The disclosure provides a curved display device having improved display quality.

Exemplary embodiments of the invention provide a curved display device including: a display substrate curved along a first direction; an opposing substrate coupled with the display substrate and curved together with the display substrate; and a liquid crystal layer including liquid crystal molecules interposed between the display substrate and the opposing substrate, where the opposing substrate includes: a common electrode; and a first alignment layer disposed on the common electrode and which aligns a first portion of the liquid crystal molecules at a first pre-tilt angle, and the display substrate includes: a pixel electrode disposed in each of a plurality of pixel areas, where a slit is defined in the pixel electrode; and a second alignment layer disposed on the pixel electrode and which aligns a second portion of the liquid crystal molecules at a second pre-tilt angle that is greater than the first pre-tilt angle.

BRIEF DESCRIPTION OF THE DRAWINGS

The above and other feature of the invention will become apparent by describing in further detail exemplary embodiments thereof with reference to the accompanying drawings, in which.

DETAILED DESCRIPTION

Figure 1A:
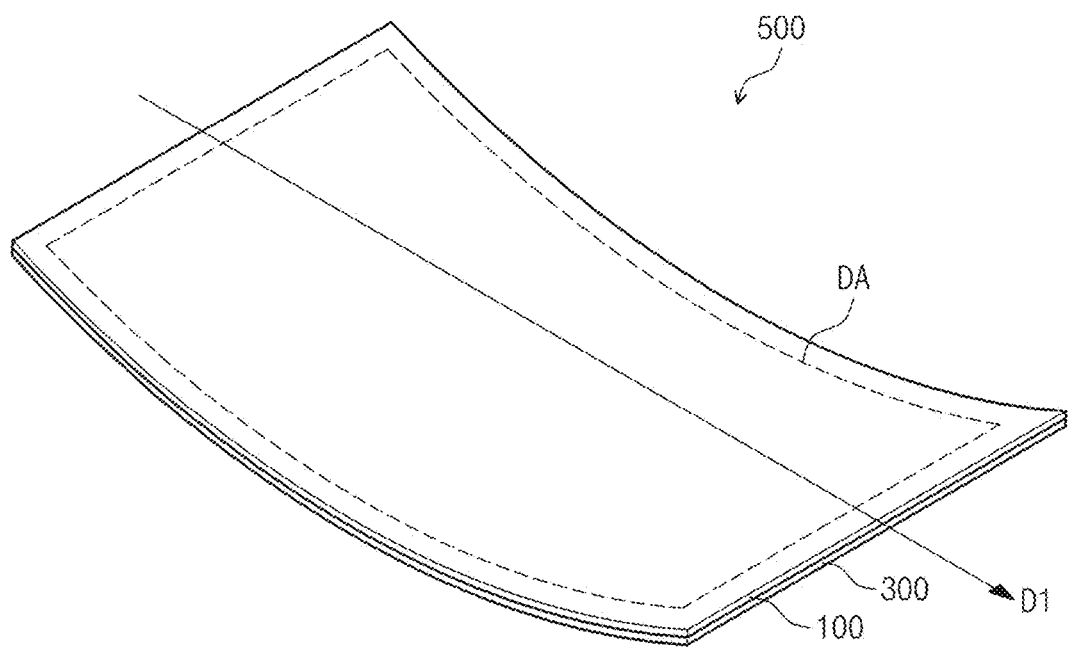
FIG. 1A is a perspective view of an exemplary embodiment of a curved display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in further detail with reference to the accompanying drawings.

Figure 1B:
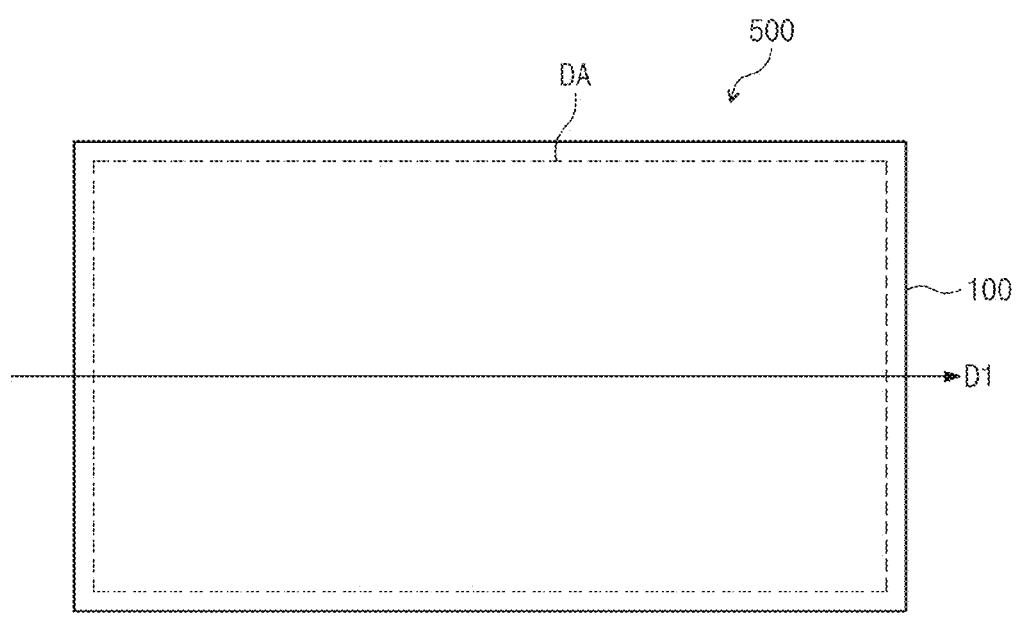
FIG. 1B is a plan view of the curved display device of FIG. 1A.

FIG. 1A is a perspective view of an exemplary embodiment of a curved display device according to the invention. FIG. 1B is a plan view of the curved display device of FIG. 1A.

Referring to FIGS. 1A and 1B, an exemplary embodiment of the curved display device 500 has a display area DA where an image is displayed and has a curved form. Accordingly, the curved display device 500 may display images with improved three-dimensional, immersive, and tense effects through the display area DA having a curved form.

Figure 3A:
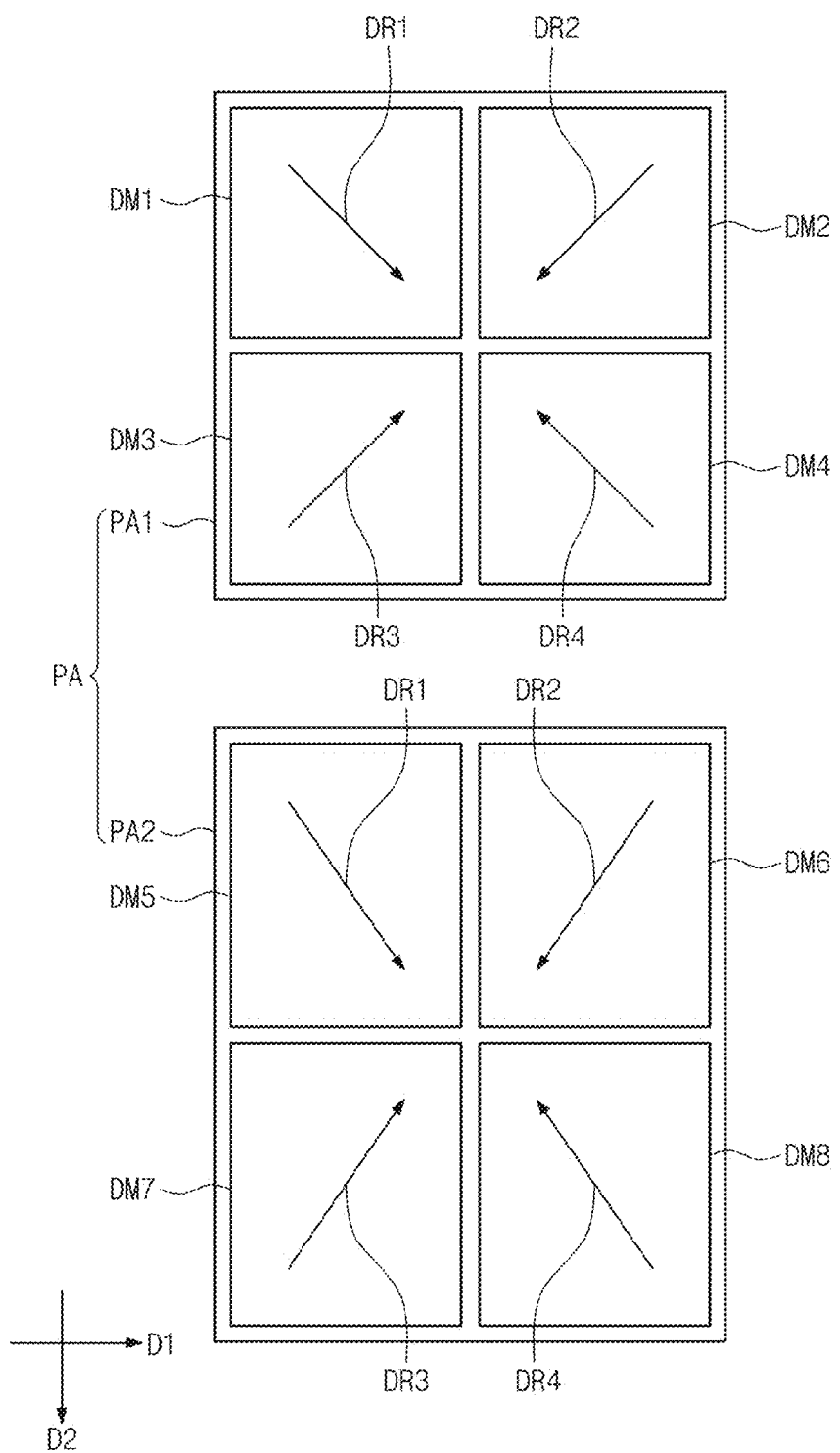
FIG. 3A is a view illustrating domains defined in the pixel of FIG. 2.
Figure 3B:
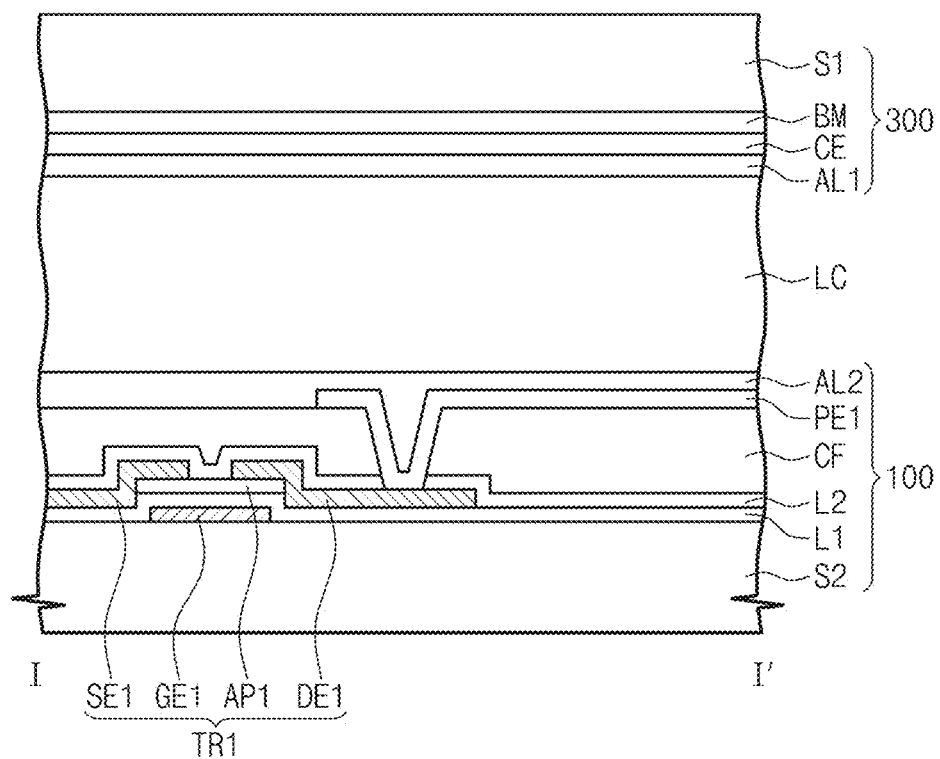
FIG. 3B is a cross-sectional view taken along line I-I' of FIG. 2.

In an exemplary embodiment, the curved display device 500 may include a display substrate 100, an opposing substrate 300 and a liquid crystal layer LC (shown in FIG. 3B). In such an embodiment, the opposing substrate 300 is coupled with the display substrate 100, facing the display substrate 100 and the liquid crystal layer LC is interposed between the display substrate 100 and the opposing substrate 300.

The curved display device 500 may further include other components besides the display substrate 100 and the opposing substrate 300, but not being limited to components described herein. In one exemplary embodiment, for example, the curved display device 500 may further include a backlight assembly (not shown) that emits light toward the display substrate 100 and the opposing substrate 300, but the invention is not limited thereto or thereby.

In an exemplary embodiment, the curved display device 500 is curved along a first direction D1 when viewed from a plan view, such that a surface thereof defines a curved plane. Accordingly, part or all of the display substrate 100 may have a form curved along the first direction D1, and the display area D1 may have a curved form curved along the first direction D1. In such an embodiment, the opposing substrate 300 may have a curved form together with the display substrate 100.

As described above, in an exemplary embodiment of manufacturing the curved display device 500, the display substrate 100 and the opposing substrate 300 are firmly coupled with each other when the display substrate 100 and the opposing substrate 300 are curved in the first direction D1 to have the curved form, such that stress may locally concentrate on the display substrate 100 and the opposing substrate 300. In such an embodiment, an area where a cell gap between the display substrate 100 and the opposing substrate 300 becomes uneven occurs in the display area DA, such that miss-alignment may occur between the display substrate 100 and the opposing substrate 300. In such an embodiment, even when the opposing substrate 300 is aligned accurately before the display substrate 100 and the opposing substrate 300 are curved, the miss-alignment may occur after the display substrate 100 and the opposing substrate 300 are curved.

Figure 4A:
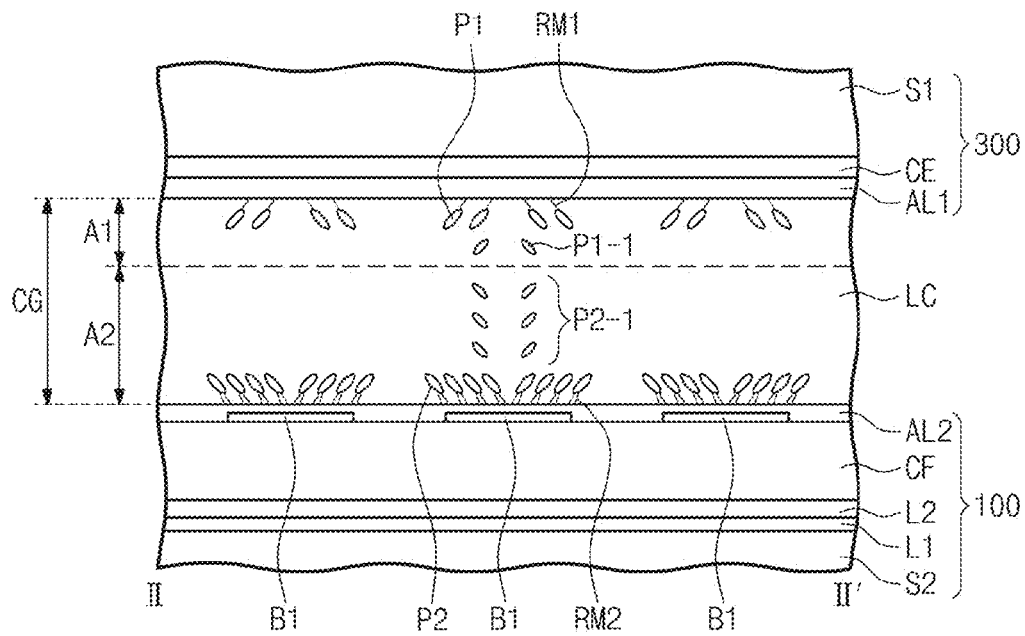
FIG. 4A is a cross-sectional view taken along line II-IF of FIG. 2.

When such a miss-alignment occurs, as shown in FIG. 4A, a pre-tilt direction of a first pre-tilt liquid crystal P1 pre-tilted by a first alignment layer AL1 may be different from a pre-tilt direction of a second pre-tilt liquid crystal P2 pre-tilted by a second alignment layer AL2. When the pre-tilt direction of the first pre-tilt liquid crystal is different from the pre-tilt direction of the second pre-tilt liquid crystal overlapping the first pre-tilt liquid crystal, since rotating directions of liquid crystal molecules are not defined accurately due to an electric field applied to the liquid crystal layer, display quality deteriorating factors such as a dark portion in the display area DA may occur. Hereinafter, an exemplary embodiment of the invention, where the display quality deterioration due to the above factors is effectively prevented, will be described in detail.

Figure 2:
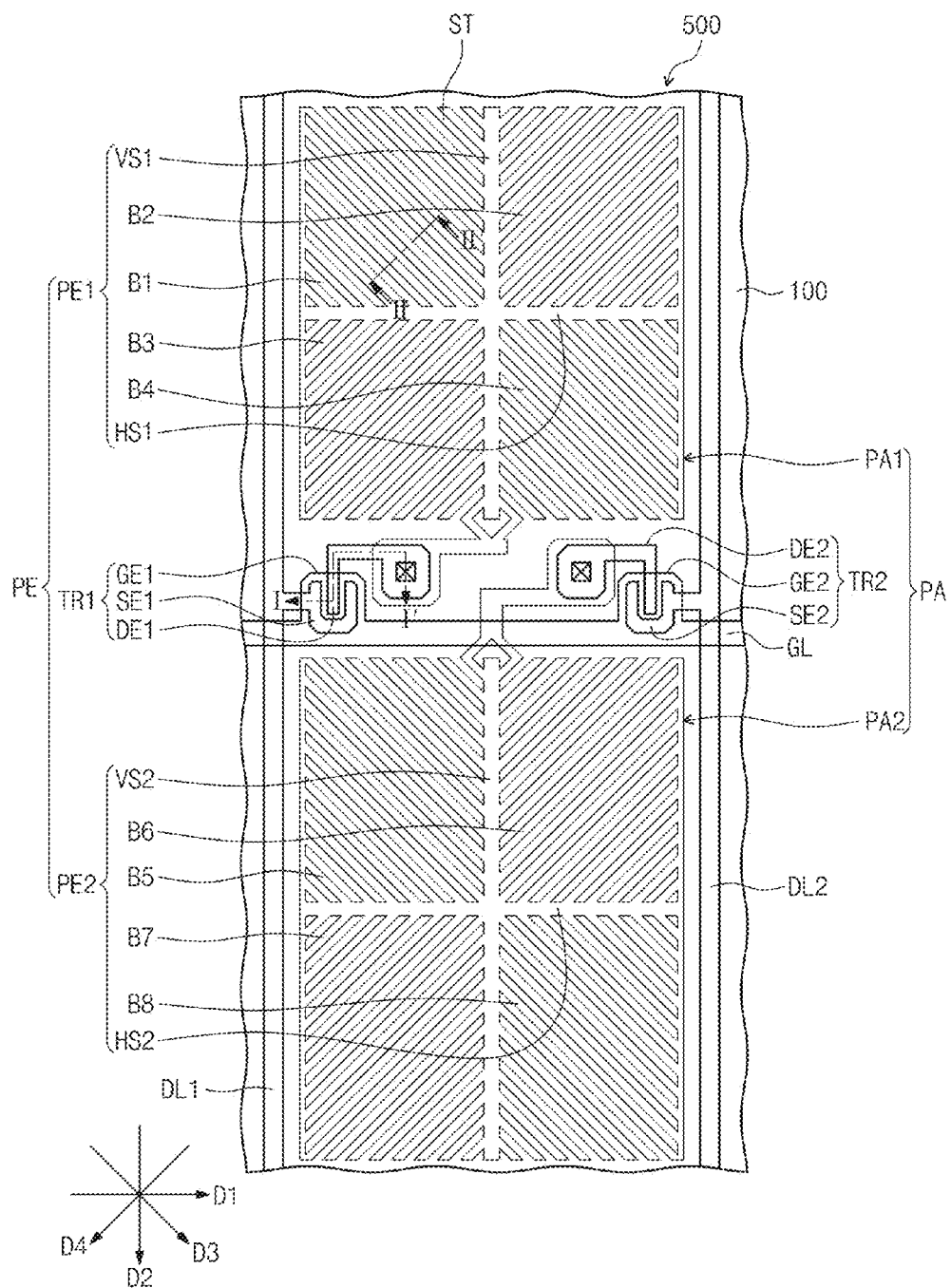
FIG. 2 is a plan view illustrating an exemplary embodiment of a pixel of the curved display device shown in FIG. 1A.

FIG. 2 is a plan view illustrating an exemplary embodiment of a pixel of the curved display device shown in FIG. 1A. FIG. 3A is a view illustrating domains defined in the pixel of FIG. 2. FIG. 3B is a cross-sectional view taken along line I-I' of FIG. 2.

An exemplary embodiment of the curved display device 500 includes a plurality of pixels. For convenience of illustration, FIG. 2 illustrates a pixel area PA of one pixel among the plurality of pixels is disposed. In such an embodiment, the pixels have structures substantially the same as each other. Hereinafter, a structure of a pixel will be described in detail with reference to FIGS. 2, 3A and 3B, and any repetitive detailed description of the remaining pixels will be omitted.

Referring to FIGS. 2, 3A, and 3B, the curved display device 500 includes a display substrate 100, an opposing substrate 300, and a liquid crystal layer LC interposed between the display substrate 100 and the opposing substrate 300.

The opposing substrate 300 includes a first base substrate S1, a light screening layer BM, a common electrode CE, and a first alignment layer AL1. In an exemplary embodiment, the first base substrate S1 may be a transparent substrate, e.g., a glass substrate having a light transmission characteristic.

In an exemplary embodiment, the common electrode CE is disposed on the first base substrate S1, and the common electrode CE generates an electric field applied on the liquid crystal layer LC, together with the pixel electrode PE. In an exemplary embodiment, the light screening layer BM screens, e.g., blocks, light. In such an embodiment, the light screening layer BM may extend along between a first sub pixel area PA1 and a second sub pixel area PA2, and the light screening layer BM may extend between two adjacent domains among first to eighth domains DM1 to DM8.

In an exemplary embodiment, the light screening layer BM is disposed on the first base substrate S1, but the invention is not limited thereto. In one alternative exemplary embodiment, for example, the light screening layer BM may be disposed on the second base substrate S2 of the display substrate 100.

The first alignment layer AU aligns the liquid crystal molecules of the liquid crystal layer LC. The first alignment layer AU may include materials for fixing liquid crystal molecules adjacent to the first alignment layer AU to the first alignment layer AL1 among the liquid crystal molecules. In one exemplary embodiment, for example, the first alignment layer AL1 may include a reactive mesogen RM coupled with the liquid crystal molecules to pre-tilt the liquid crystal molecules. The first alignment layer AU will be described later in greater detail with reference to FIGS. 4A to 4C.

The display substrate 100 includes a second base substrate S2, a gate line GL, a first data line DL1, a second data line DL2, a first thin film transistor TR1, a second thin film transistor TR2, a pixel electrode PE, a color filter CF and a second alignment layer AL2.

In an exemplary embodiment, the second base substrate S2 may be a transparent substrate, e.g., a glass substrate having a light transmission characteristic. The gate line GL is disposed on the second base substrate S2 and is electrically connected to the first and second thin film transistors TR1 and TR2 to transmit a gate signal to the first and second thin film transistors TR1 and TR2.

In an exemplary embodiment, the pixel area PA may be divided into a first sub pixel area PA1 and a second sub pixel area PA2. In an exemplary embodiment, as shown in FIG. 2, the pixel electrode PE may include a first sub pixel electrode PE1 disposed in the first sub pixel area PA1 and a second sub pixel electrode PE2 disposed in the second sub pixel area PA2.

The first and second data lines DL1 and DL2 are insulated from the gate line GL and are disposed on the second base substrate S2. The first data line DL1 transmits a first data signal, and the second data line DL2 transmits a second data signal. In an exemplary embodiment, the first data line DL1 extends along one side of the first and second sub pixel electrodes PE1 and PE2, and the second data line DL2 may extend along the other side of the first and second sub pixel electrodes PE1 and PE2.

The first thin film transistor TR1 is electrically connected to the gate line GL, the first data line DL1 and the first sub pixel electrode PE1. The first thin film transistor TR1 includes a first gate electrode GE1, a first active pattern AP1, a first source electrode SE1 and a first drain electrode DE1. The first gate electrode GE1 is branched from the gate line GL, and the first active pattern AP1 may be disposed on the first gate electrode GE1 with a first insulating layer L1 between the first active pattern AP1 and the first gate electrode GE1. The first source electrode SE1 is branched from the first data line DL1 and contacts the first active pattern AP1, and the first drain electrode DE1 is spaced apart from the first source electrode SE1 and contacts the first active pattern AP1.

The second insulating layer L2 covers the first and second thin film transistors TR1 and TR2, and the color filter CF is disposed on the second insulating layer L2 to filter or convert a light incident toward the display substrate 100 through the second base substrate S2 as color light.

The second thin film transistor TR2 is electrically connected to the gate line GL, the second data line DL2 and the second sub pixel electrode PE2. The second thin film transistor TR2 includes a second gate electrode GE2, a second active pattern, a second source electrode SE2 and a second drain electrode DE2. In such an embodiment, the second thin film transistor TR2 has a structure substantially the same as the first thin film transistor TR1, and any repetitive detailed description of the second thin film transistor TR2 will be omitted.

In an exemplary embodiment, the first and second thin film transistors TR1 and TR2 are turned on by the gate signal. The first data signal is provided to the first sub pixel electrode PE1 through the turned-on first thin film transistor TR1, and the second data signal different from the first data signal is provided to the second sub pixel electrode PE2 through the turned-on second thin film transistor TR2. Accordingly, the first and second sub pixel electrodes PE1 and PE2 are driven by different data signals, such that different gradations may be displayed on the first and second sub pixel areas PA1 and PA2.

In an exemplary embodiment, the first sub pixel electrode PE1 includes a first horizontal branch part HS1 a first vertical branch part VS1, and first to fourth branch parts B1, B2, B3 and B4. The first horizontal branch part HS1 extends along a first direction D1 and crosses over the first sub pixel area PA1. The first vertical branch part VS1 extends along a second direction D2, crosses over the first sub pixel area PA1 and is connected to the first horizontal branch part HS1. In such an embodiment, the first direction D1 may intersect the second direction D2, e.g., the first direction D1 may be orthogonal to the second direction D2.

The first branch parts B1 are branched from the first horizontal branch part HS1 or the first vertical branch part VS1. The first branch parts B1 are spaced apart from each other, and a slit ST may be defined between adjacent two first branch parts B1 among the first branch parts B1. In an exemplary embodiment, each of the first branch parts B1 may extend in a third direction D3 that is tilted from the first direction D1 and the second direction D2 when viewed from a plan view. In such an embodiment, an acute angle formed by the third direction D3 and one of the first and second directions D1 and D2 when viewed from a plan view may be in a range of about 40° to about 50°.

The second branch parts B2 are branched from the first horizontal branch part HS1 or the first vertical branch part VS1. In an exemplary embodiment, each of the second branch parts B2 may extend in a fourth direction D4 that is tilted from the first direction D1 and the second direction D2 when viewed from a plan view. In such an embodiment, the fourth direction D4 may intersect the third direction D3, and an acute angle formed by the fourth direction D4 and one of the first and second directions D1 and D2 may be in a range of about 40° to about 50°.

The third branch parts B3 are branched from the first horizontal branch part HS1 or the first vertical branch part VS1, and the fourth branch parts B4 are branched from the first horizontal part HS1 or the first vertical branch part VS1. In an exemplary embodiment, each of the third branch parts B3 may extend in the fourth direction D4 when viewed from a plan view, and each of the fourth branch parts B4 may extend in the third direction D3 when viewed from a plan view.

The second sub pixel electrode PE2 includes a second horizontal branch part HS2 a second vertical branch part VS2, and fifth to eighth branch parts B5, B6, B7 and B8. In such an embodiment, while the size of the second sub pixel electrode PE2 may be greater than the first sub pixel electrode PE1, the first and second sub pixel electrodes PE1 and PE2 have a similar structure, and any repetitive detailed description of a structure of the second sub pixel electrode PE2 will be omitted.

In such an embodiment, first to fourth domains DM1, DM2, DM3 and DM4 may be defined by the first to fourth branch parts B1 to B4 in the first sub pixel area PA1, and fifth to eighth domains DM5, DM6, DM7 and DM8 may be defined by the fifth to eighth branch parts B5 to B8 in the second sub pixel area PA2.

In such an embodiment, the first to eighth domains DM1 to DM8 may be defined in one-to-one correspondence to areas where the first to eighth branch parts B1 to B8 are disposed. When an electric field is generated between the pixel electrode PE and the common electrode CE, liquid crystal molecules of the liquid crystal layer LC are aligned in a first liquid crystal alignment direction DR1 in the first domain DM1. In such an embodiment, in correspondence to the electric field, the liquid crystal molecules in the second to fourth domains DM2, DM3 and DM4 are aligned in one-to-one correspondence to the second to fourth liquid crystal alignment directions DR2, DR3 and DR4. The first to fourth liquid crystal alignment directions DR1, DR2, DR3 and DR4 are different from each other.

In an exemplary embodiment, the liquid crystal molecules in the fifth to eighth domains DM5 to DM8 are aligned in one-to-one correspondence to the first to fourth liquid crystal alignment directions DR1, DR2, DR3 and DR4, based on directions in which the liquid crystal molecules are aligned in the first to fourth domains DM1 to DM4.

In an exemplary embodiment, the first and second domains DM1 and DM2 may be aligned substantially in the first direction D1, the third and fourth domains DM3 and DM4 may be aligned substantially in the first direction D1, the first and third domains DM1 and DM3 may be aligned substantially in the second direction D2, and the second and fourth domains DM2 and DM4 may be aligned substantially in the second direction D2.

The second alignment layer AL2 aligns the liquid crystal molecules of the liquid crystal layer LC. In an exemplary embodiment, the second alignment layer AL2 may include materials that fix liquid crystal molecules adjacent to the second alignment layer AL2 among the liquid crystal molecules to the second alignment layer AL2. In one exemplary embodiment, for example, the second alignment layer AL2 may include a reactive mesogen RM coupled with the liquid crystal molecules to pre-tilt the liquid crystal molecules.

In such an embodiment, where the liquid crystal molecules are aligned by the electric field described above and thereby pre-tilted by the first and second alignment layers AL1 and AL2, a response time of the curved display device 500 may be improved.

Figure 4B:
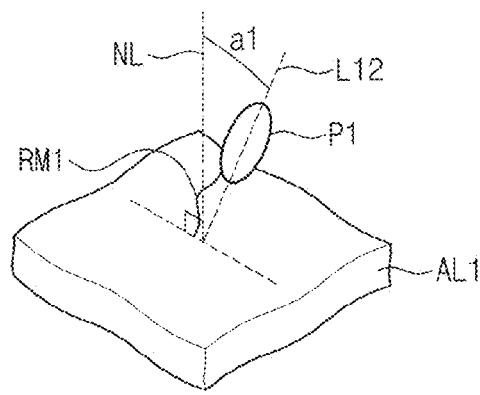
FIG. 4B is an enlarged view of a first pre-tilt liquid crystal shown in FIG. 4A.
Figure 4C:
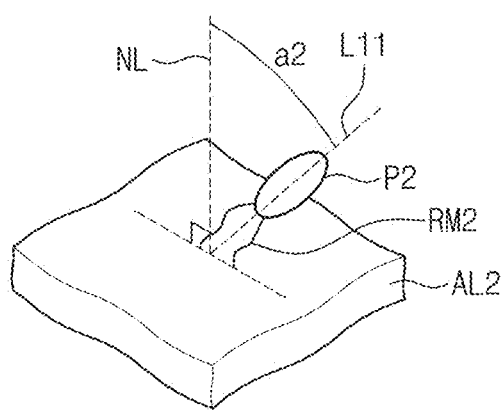
FIG. 4C is a view illustrating a second pre-tilt liquid crystal shown in FIG. 4A.

FIG. 4A is a cross-sectional view taken along line II-IF of FIG. 2. FIG. 4B is an enlarged view of a first pre-tilt liquid crystal shown in FIG. 4A. FIG. 4C is a view illustrating a second pre-tilt liquid crystal shown in FIG. 4A.

Referring to FIGS. 4A, 4B and 4C, a cell gap CG is defined between the display substrate 100 and the opposing substrate 300, and a liquid crystal layer LC including liquid crystal molecules is disposed in the cell gap CG. In an exemplary embodiment, liquid crystal molecules pre-tilted by the first alignment layer AL1 among the liquid crystal molecules are defined as first pre-tilt liquid crystals P1, and liquid crystal molecules pre-tilted by the second alignment layer AL2 among the liquid crystal molecules are defined as second pre-tilt liquid crystals P2. In an exemplary embodiment, as shown in FIGS. 4B and 4C, the first alignment layer AL1 aligns the first pre-tilt liquid crystals P1 at a first pre-tilt angle a1, and the second alignment layer AL2 aligns the second pre-tilt liquid crystals P2 at a second pre-tilt angle a2.

In such an embodiment, as shown in FIG. 4B, an angle formed by a normal line NL of the first alignment layer AL1 and a first major axis L12 of the first pre-tilt liquid crystals P1 may be defined as the first pre-tilt angle a1. In such an embodiment, as shown in FIG. 4C, an angle formed by a normal line NL of the second alignment layer AL2 and a second major axis L11 of the second pre-tilt liquid crystals P1 may be defined as the second pre-tilt angle a2.

In an exemplary embodiment, the second pre-tilt angle a2 is greater than the first pre-tilt angle a1. In one exemplary embodiment, for example, the first pre-tilt angle a1 may be about 0.2°, and the second pre-tilt angle a2 may be about 1°. In such an embodiment, where the second pre-tilt angle a2 is greater than the first pre-tilt angle a1, in response to an electric field applied to the cell gap CG, the tendency that liquid crystal molecules in the cell gap CG move by the second pre-tilt liquid crystals P2 is greater than the tendency that liquid crystal molecules move by the first pre-tilt liquid crystals P1.

In such an embodiment, when some of the liquid crystal molecules of which first pre-tilt liquid crystals P1 are aligned substantially parallel to a pre-tilted direction in response to the electric field are defined as first liquid crystal molecules P1-1 and the remaining liquid crystal molecules of which second pre-tilt liquid crystals P2 are aligned substantially parallel to a pre-tilted direction in response to the electric field are defined as second liquid crystal molecules P2-1, the amount of the second liquid crystal molecules P2-1 is greater than the amount of the first liquid crystal molecules P1-1.

Accordingly, when the cell gap CG is divided into a first space A1 and a second space A2 arranged in a direction vertical to the base substrate S2, the first space A1 is defined as a space filled with the first liquid crystal molecules P1-1, and when the second space A2 is defined as a space filled with the second liquid crystal molecules P2-2, a length in a thickness direction of the second space A2 is greater than that of the first space A1 when viewed from a sectional view.

In an exemplary embodiment, as described above, the amount of the second liquid crystal molecules P2-1 is greater than the amount of the first liquid crystal molecules P1-1. In such an embodiment, the first alignment layer AU may include a first reactive mesogen RM1 that fixes the liquid crystal molecules to the first alignment layer AL1, and the second alignment layer AL2 may include a second reactive mesogen RM2 that fixes the liquid crystal molecules to the second alignment layer AL2. In such an embodiment, the amount of the second reactive mesogen RM2 per unit area of the second alignment layer AL2 is greater than the amount of the first reactive mesogen RM1 per unit area of the first alignment layer AL1. Accordingly, in such an embodiment, where the amount of the second reactive mesogen RM2 is greater than the amount of the first reactive mesogen RM1, the amount of the second pre-tilt liquid crystals P2 fixed at the second alignment layer AL2 by the second reactive mesogen RM2 is greater than the amount of the first pre-tilt liquid crystals P1.

In such an embodiment, the amount of the second reactive mesogens RM2 respectively coupled with the second pre-tilt liquid crystals P2 may be greater than the amount of the first reactive mesogens RM1 respectively coupled with the first pre-tilt liquid crystals P1. As a result, the force that each of the second pre-tilt liquid crystals P2 is pulled toward the surface of the second alignment layer AL2 by the second reactive mesogen RM2 is greater than the force that each of the first alignment layer AL1 is pulled toward the surface of the first alignment layer AL1 by the first reactive mesogen RM1. Accordingly, the second pre-tilt angle a2 is greater than the first pre-tilt angle a1.

As described with reference to FIGS. 1A and 1B, when an exemplary embodiment of a curved display device is curved, miss-alignment may occur between the display substrate 100 and the opposing substrate 300. In such an embodiment, as described above, the amount of the second liquid crystal molecules P2-1 may be greater than the amount of the first liquid crystal molecules P1-1. In such an embodiment, when the miss-alignment occurs, although a pre-tilt direction of the first pre-tilt liquid crystals P1 is different from pre-tilt directions of the second pre-tilt liquid crystals P2 overlapping the first pre-tilt liquid crystals P1, as described above, since the amount of the first pre-tilt liquid crystals P1 is greater than the amount of the second pre-tilt liquid crystals P2, the amount of liquid crystal molecules aligned in opposite directions may be reduced in an area where the miss-alignment occurs. Accordingly, display quality deteriorating factors such as a dark portion in the curved display device 500 may be reduced.

Figure 5A:
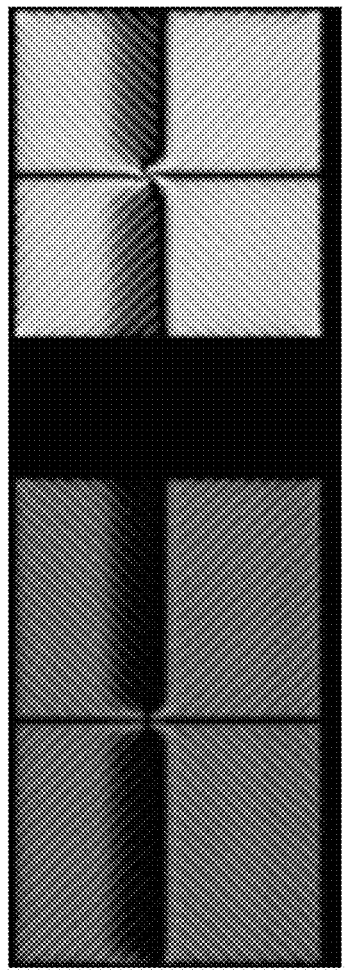
FIGS. 5A to 5D are photographic views illustrating brightness of first to eighth domains according to a first pre-tilt angle and a second pre-tilt angle.
Figure 5B:
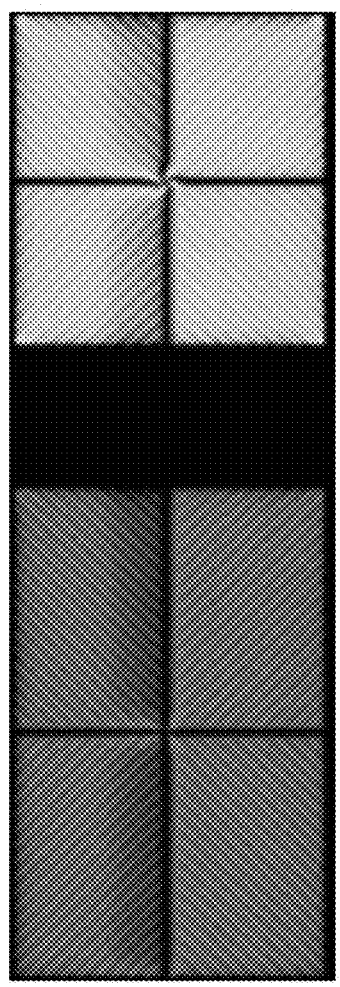
Figure 5C:
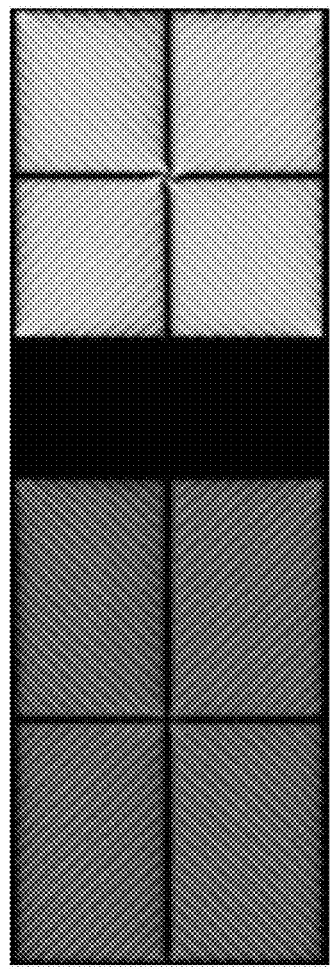
Figure 5D:
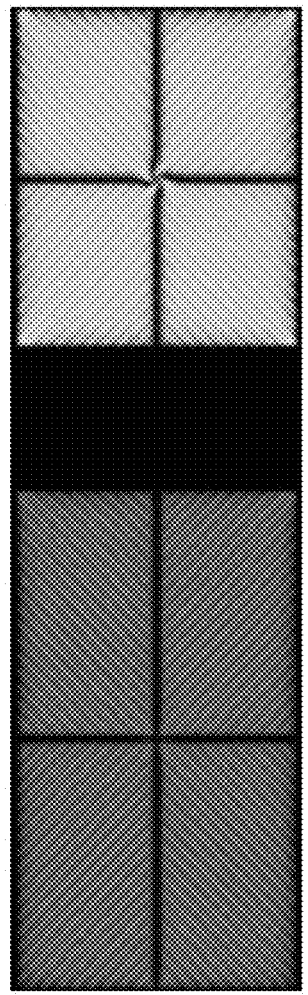

FIGS. 5A to 5D are photographic views illustrating brightness of first to eighth domains according to a first pre-tilt angle and a second pre-tilt angle. In more detail, FIGS. 5A and 5B are photographic views illustrating brightness of domains in comparative embodiments of the curved display device, and FIGS. 5C and 5D are photographic views illustrating brightness of domains in exemplary embodiments of the curved display device according to the invention.

Referring to FIG. 5A, brightness in domains in a comparative embodiment, where the first pre-tilt angle a1 described with reference to FIG. 4B (or first line tilt angle) is about 1° and the second pre-tilt angle a2 described with reference to FIG. 4C (or second line tilt angle) is about 1°, is shown. In such a comparative embodiment, a dark portion in a strip form along the second direction D2 (shown in FIG. 3A) appears in the domains and may deteriorate the display quality of a curved display device.

Referring to FIG. 5B, brightness in domains of a comparative embodiment, where the first pre-tilt angle is about 0.5° and the second pre-tilt angle is about 1°, is shown. In such a comparative embodiment, a dark portion in a strip form is shown in the domains. The brightness of the dark portion shown in FIG. 5B is greater than the brightness of the dark portion shown in FIG. 5A, but the dark portion shown in FIG. 5B may be noticed by a user.

Referring to FIG. 5C, brightness in domains of an exemplary embodiment of the invention, where the first pre-tilt angle is about 0.2° and the second pre-tilt angle is about 1°, is shown. In such an embodiment, a dark portion in a strip form is not displayed in the domains and overall brightness in the domains is substantially uniform.

Referring to FIG. 5D, brightness in domains of an exemplary embodiment of the invention, where the first pre-tilt angle is about 0° and the second pre-tilt angle is about 1°, is shown. In such an embodiment, a dark portion in a strip form is not displayed in the domains and an overall brightness in the domains may become substantially uniform.

In an exemplary embodiment, as shown in FIGS. 5A to 5D, when the second pre-tilt angle is greater than the first pre-tilt angle and a difference between the second pre-tilt angle and the first pre-tilt angle is in a range of about 0.4° to about 1.2°, uniform brightness may be displayed in the domains. In such an embodiment, where the difference between the second pre-tilt angle and the first pre-tilt angle in a about 0.4° to about 1.2°, the first pre-tilt angle may be less than about 0.4°, such that a dark portion may not occur in the domains and uniform brightness is shown in the domains.

Figure 6A:
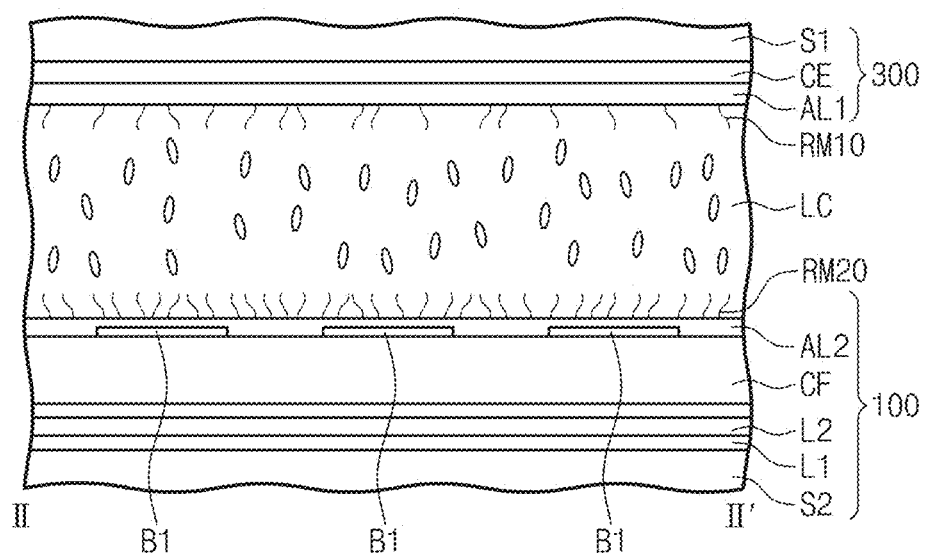
FIGS. 6A and 6B are views illustrating an exemplary embodiment of a method of providing the first and second pre-tilt liquid crystals shown in FIG. 4A.
Figure 6B:
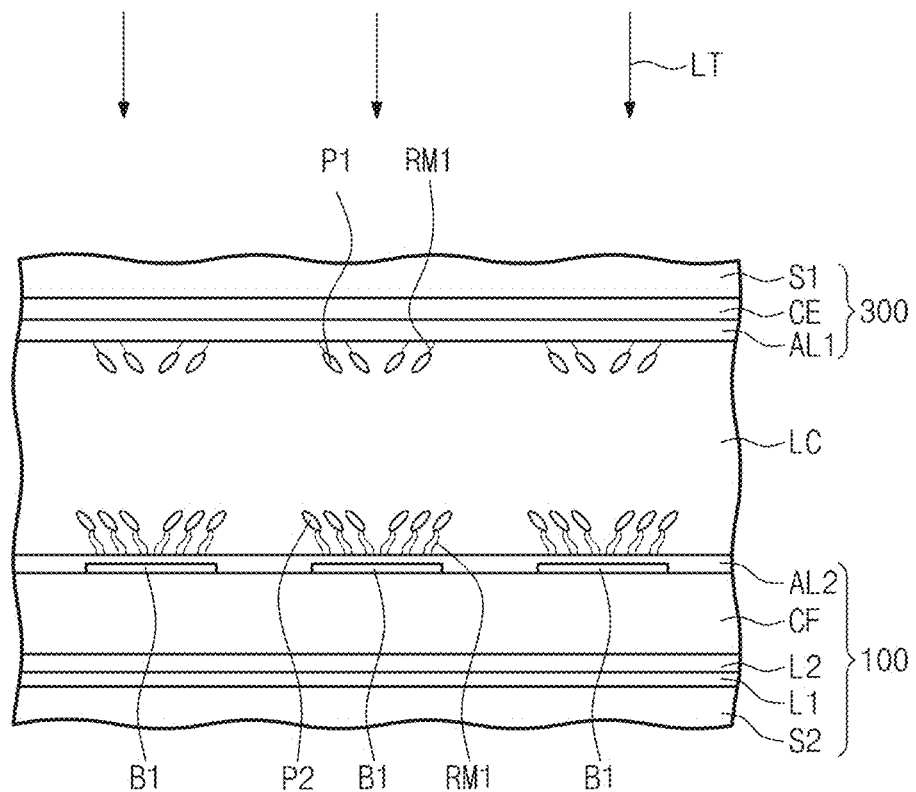

FIGS. 6A and 6B are views illustrating an exemplary embodiment of a method of providing the first and second pre-tilt liquid crystals shown in FIG. 4A.

Referring to FIG. 6A, in an exemplary embodiment, the display substrate 100 and the opposing substrate 300 may be provided independently of each other. In one exemplary embodiment, for example, the display substrate 100 may be manufactured completely, and then the opposing substrate 300 may be manufactured completely. In such an embodiment, liquid crystal molecules are provided to one of the display substrate 100 and the opposing substrate 300 and then, the display substrate 100 and the opposing substrate 300 may be coupled with each other. As a result, a liquid crystal layer LC including the liquid crystal molecules is provided between the display substrate 100 and the opposing substrate 300.

In an exemplary embodiment, when the display substrate 100 and the opposing substrate 300 are coupled with each other, the first alignment layer AU in the opposing substrate 300 is exposed to the liquid crystal layer LC and the second alignment layer AL2 in the display substrate 100 is exposed to the liquid crystal layer LC. In such an embodiment, the first alignment layer AL1 includes a first reactive mesogen RM10, and the second alignment layer AL2 includes a second reactive mesogen RM20. In such an embodiment, the amount of the second reactive mesogen RM20 is greater than the amount of the first reactive mesogen RM10.

Referring to FIG. 6B, while an electric field is generated in a liquid crystal LC by a potential difference between the pixel electrode PE and the common electrode CE, light LT is irradiated on the liquid crystal layer LC. As a result, liquid crystal molecules are aligned by the electric field and simultaneously, the first and second reactive mesogens RM1 and RM2 harden the aligned liquid crystal molecules by the irradiated light. As a result, liquid crystal molecules adjacent to the first alignment layer AL1 among the liquid crystal molecules are fixed at the first alignment layer AL1 by the first reactive mesogen RM1, and the first pre-tilt liquid crystals P1 are thereby provided in the first alignment layer AL1. In such an embodiment, liquid crystal molecules adjacent to the second alignment layer AL2 among the liquid crystal molecules are fixed at the second alignment layer AL2 by the second reactive mesogen RM2, and the second pre-tilt liquid crystals P2 are thereby provided in the second alignment layer AL2.

In an exemplary embodiment, where the amount of the second reactive mesogen RM2 is greater than the amount of the first reactive mesogen RM1, the amount of the second pre-tilt liquid crystals P2 is greater than the amount of the first pre-tilt liquid crystals P1. In such an embodiment, where the amount of the second reactive mesogens RM2 respectively coupled with the second pre-tilt liquid crystals P2 is greater than the amount of the first reactive mesogens RM1 respectively coupled with the first pre-tilt liquid crystals P1, a pre-tilt angle of the second pre-tilt liquid crystals P2 may be greater than a pre-tilt angle of the first pre-tilt liquid crystals.

Figure 7:
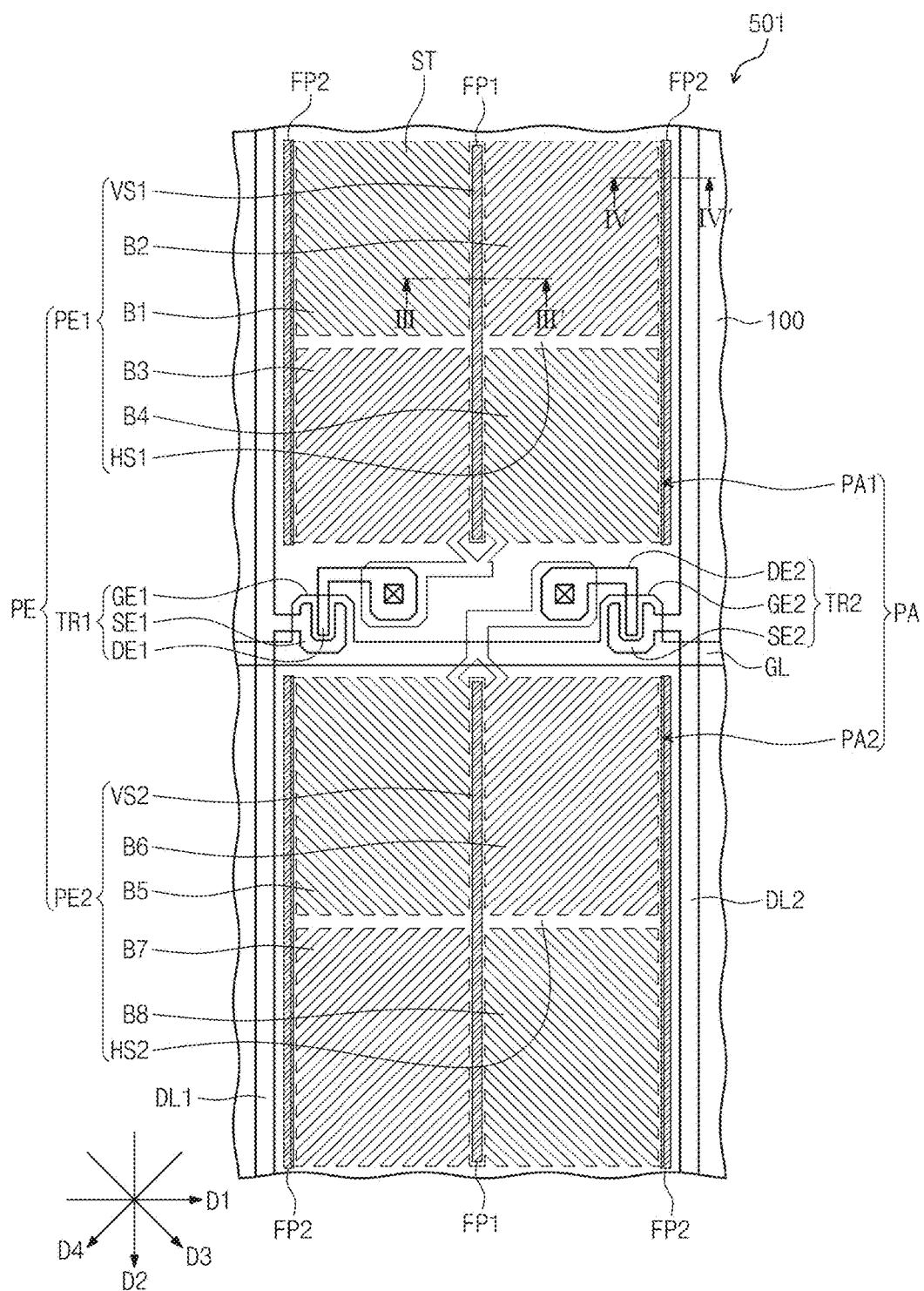
FIG. 7 is a plan view illustrating a pixel of an alternative exemplary embodiment of a curved display device according to the invention.
Figure 8A:
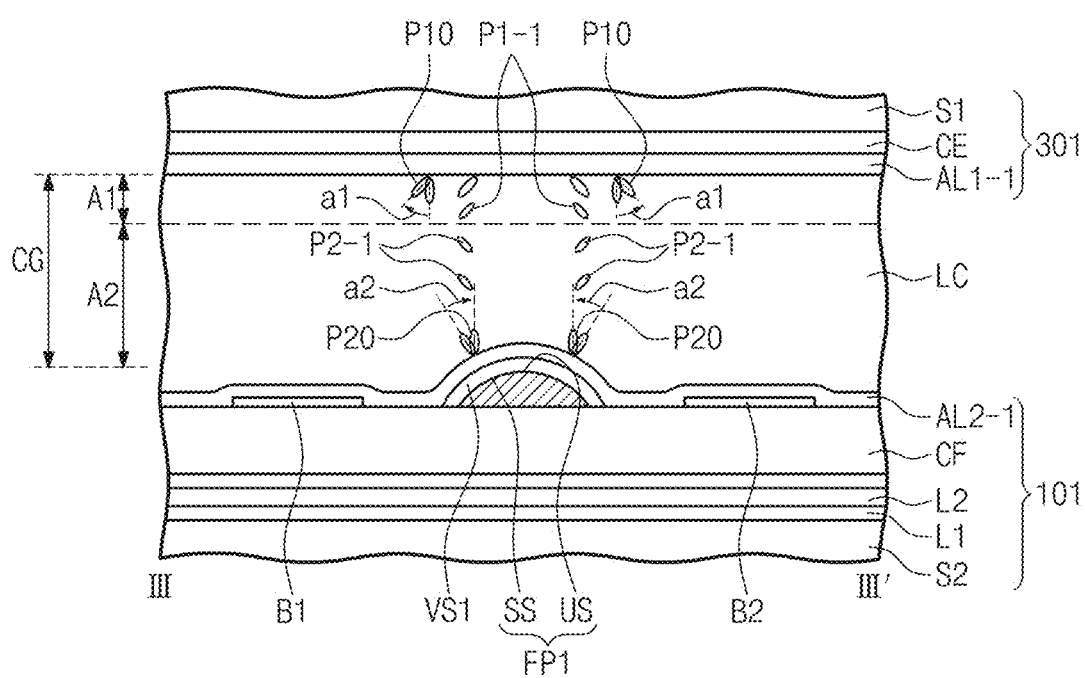
FIG. 8A is a cross-sectional view taken along line III-III' of FIG. 6.
Figure 8B:
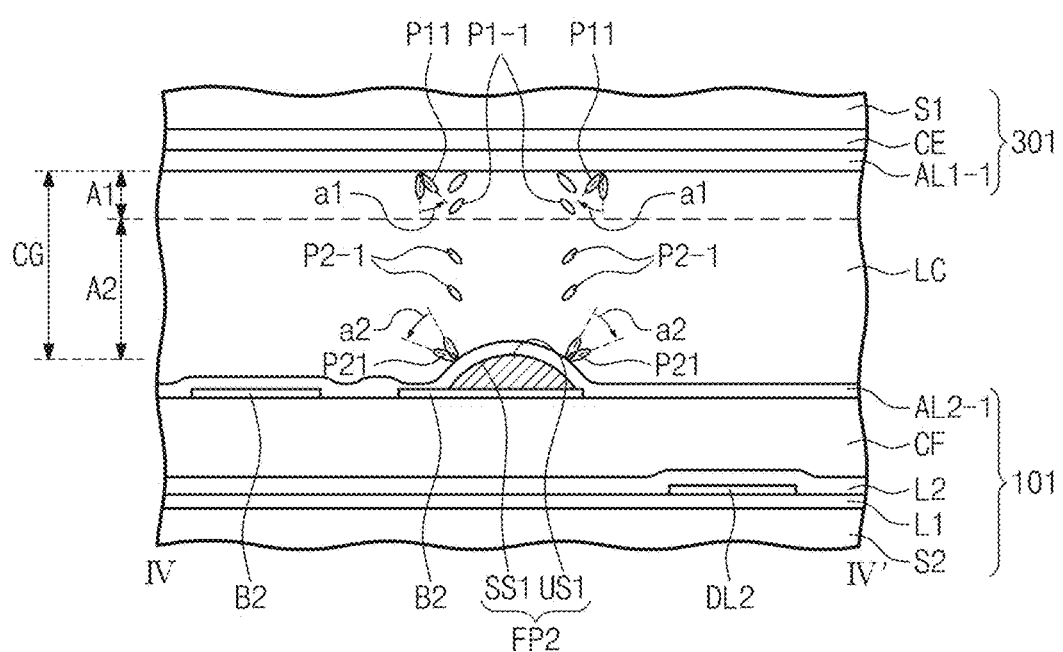
FIG. 8B is a cross-sectional view taken along line IV-IV' of FIG. 7.

FIG. 7 is a plan view illustrating a pixel of an alternative exemplary embodiment of a curved display device according to the invention. FIG. 8A is a cross-sectional view taken along line III-III' of FIG. 6. FIG. 8B is a cross-sectional view taken along line IV-IV' of FIG. 7. The curved display device shown in FIGS. 7, 8A and 8B are substantially the same as the curved display device shown in FIGS. 2 to 4C except for protrusion parts. The same or like elements shown in FIGS. 7, 8A and 8B have been labeled with the same reference characters as used above to describe exemplary embodiments of the curved display device with reference to FIGS. 2 to 4C, and any repetitive detailed description thereof will hereinafter be omitted or simplified.

Referring to FIGS. 7 and 8A, an exemplary embodiment of the curved display device 501 includes a display substrate 101, an opposing substrate 301 and a liquid crystal layer LC. In such an embodiment, the opposing substrate 301 includes a first base substrate S1, a common electrode CE and a first alignment layer AL1-1. In such an embodiment, the display substrate 101 includes a second base substrate S2, a pixel electrode PE, a second alignment layer AL2-1, first protrusion parts FP1 and second protrusion parts FP2.

Each of the first protrusion parts FP1 extends substantially along a second direction D2 when viewed from a plan view, and the first protrusion parts FP1 may include an insulating material that absorbs light like the light screening layer BM of FIG. 3B. In an exemplary embodiment, one of the first protrusion parts FP1 is disposed between a second base substrate S2 and a first vertical branch part VS1 of a first sub pixel electrode PE1, and overlaps the first vertical branch part VS1 when viewed from a plan view. Another one of the first protrusion parts FP1 is disposed between the second base substrate S2 and a second vertical branch part VS2 of a second sub pixel electrode PE2, and overlaps the second vertical branch part VS2 when viewed from a plan view.

In an exemplary embodiment, as shown in FIG. 6A, by varying the amounts of the first and second reactive mesogens RM1 and RM2 of FIG. 4A over an entire pixel area PA, the pre-tilt angles of the first and second pre-tilt liquid crystals P1 and P2 may be controlled to be different from each other. In an alternative exemplary embodiment, the pre-tilt angles of the first and second pre-tilt liquid crystals P10 and P20 in a portion of the pixel area PA are controlled to be different from each other by the first protrusion parts FP1. In such an embodiment, the first protrusion parts FP1 have substantially the same structure and function as each other, and, for convenience of description, a structure and function of a first protrusion part FP1 overlapping the first vertical branch part VS1 among the plurality of first protrusion parts FP1 will hereinafter be described in detail.

In an exemplary embodiment, the first protrusion part FP1 may have a protruding form toward the liquid crystal layer LC when viewed from a sectional view. Accordingly, an uppermost side US and a slanting side SS may be defined on the first protrusion part FP1, and the slanting side SS is connected to the uppermost side US and may have a form tilted toward the second base substrate SS.

In such an embodiment, the first protrusion part FP1 is disposed between the first vertical branch part VS1 and the second base substrate S2, such that a separation distance between the first vertical branch part VS1 and the common electrode CE may be reduced by a thickness of the first protrusion part FP1. Accordingly, in correspondence to the reduced separation distance, the intensity of a first electric field generated between the first vertical branch part VS1 on the first protrusion part FP1 and the common electrode CE may be greater than the intensity of a second electric field generated between each of the first and second branch parts B1 and B2 and the common electrode CR, and the intensity of a fringe field of the first electric field may be strengthened by the slanting side SS of the first protrusion part FP1.

In such an embodiment, a liquid crystal pre-tilted by a flat portion of the first alignment layer AL1-1 is defined as first pre-tilt liquid crystals P10, and a liquid crystal pre-tilted by a curved portion of the second alignment layer AL2-1 in correspondence to the position of the slanting side SS is defined as second pre-tilt liquid crystals P20. As described above, when the intensity of the first electric field is greater than the intensity of the second electric field and the intensity of the fringe field of the first electric field is further increased compared to the intensity of the second electric field, the second pre-tilt liquid crystals P20 are tilted toward the uppermost side US, such that the second pre-tilt angle a2 of the second pre-tilt liquid crystals P20 may become greater than the first pre-tilt angle a1 of the first pre-tilt liquid crystals P10. In such an embodiment, a light irradiation process for fixing the first and second pre-tilt liquid crystals P10 and P20 at the first and second alignment layers AL1-1 and AL2-1 may be performed while the first and second electric fields are formed, and the first and second pre-tilt angles a1 and a2 are affected from the intensity and direction of the first and second electric fields.

As a result, in such an embodiment, as described with reference to FIGS. 4A to 4C, the second pre-tilt angle a2 is greater than the first pre-tilt angle a1, such that the tendency that the liquid crystal molecules move by the second pre-tilt liquid crystals P20 is greater than the tendency that the liquid crystal molecules move by the first pre-tilt liquid crystals P10.

In such an embodiment, the amount of second liquid crystal molecules P2-1 that align substantially parallel to a pre-tilted direction of the second pre-tilt liquid crystals P20 in a second space A2 in response to the electric field becomes greater than the amount of first liquid crystal molecules P1-1 that align substantially parallel to a pre-tilted direction of the first pre-tilted liquid crystals P10 in a first space A1. Therefore, the amount of liquid crystal molecules aligned in opposite directions may be reduced in an area where miss-alignment occurs between the display substrate 101 and the opposing substrate 301, such that the display quality of the curved display device 501 may be substantially improved.

Referring to FIGS. 7 and 8B, each of the second protrusion parts FP2 extends substantially along a second direction D2 when viewed from a plan view and may include an insulating material. In such an embodiment, one of the second protrusion parts FP2 is disposed on a first sub pixel electrode PE1 and overlaps both edges substantially parallel to the second direction D2 of the first sub pixel electrode PE1, and another one of the second protrusion parts FP2 is disposed on the second sub pixel electrode PE2 and overlaps both edges parallel to the second direction D2 of the second sub pixel electrode PE2. In such an embodiment, the second protrusion parts FP2 have substantially the same structure and function as each other, for convenience of description, a structure and function of a second protrusion part FP2 overlapping one edge of the second branch part B2 of the first sub pixel electrode PE1 will hereinafter be described in greater detail.

In an exemplary embodiment, the second protrusion part FP2 may have a protruding form toward the liquid crystal layer LC on a section. Accordingly, an uppermost side US1 and a slanting side SS1 may be defined when viewed from a sectional view, and the slanting side SS1 is connected to the uppermost side US1 and may have a form tilted toward the second base substrate S2.

In such an embodiment, the second protrusion part FP2 is disposed on the second branch part B2, such that the intensity of an electric field between the second branch part B2 on the second protrusion part FP2 and the common electrode CE may become less than the intensity of an electric field generated from the surrounding, and the intensity of a fringe field of an electric field the second branch part B2 disposed on the second protrusion part FP2 may be strengthened by the form of the slanting side SS1.

In an exemplary embodiment, a liquid crystal pre-tilted by a flat portion of the first alignment layer AL1-1 is defined as first pre-tilt liquid crystals P11, and a liquid crystal pre-tilted by a curved portion of the second alignment layer AL2-1 in correspondence to the position of the slanting side SS1 is defined as second pre-tilt liquid crystals P21. In such an embodiment, due to the electric field from the second branch part B2 disposed on the second protrusion part FP2, as shown in FIG. 8B, the second pre-tilt liquid crystals P21 are tilted toward the lower part of the slanting side SS1 such that the second pre-tilt angle a2 of the second pre-tilt liquid crystals P21 may become greater than the first pre-tilt angle a1 of the first pre-tilt liquid crystals P11.

As a result, as described above with reference to FIGS. 4A to 4C, in an exemplary embodiment, where the second pre-tilt angle a2 is greater than the first pre-tilt angle a1, the tendency that the second liquid crystal molecules P2-1 move by the second pre-tilt liquid crystals P21 is greater than the tendency that the first liquid crystal molecules P1-1 move by the first pre-tilt liquid crystals P11. Therefore, in such an embodiment, the amount of the second liquid crystal molecules P2-1 is greater than the amount of the first liquid crystal molecules P1-1 and as a result, the amount of liquid crystal molecules aligned in opposite directions may be reduced in an area where miss-alignment occurs between the display substrate 101 and the opposing substrate 301, such that the display quality of the curved display device 501 may be substantially improved.

In an exemplary embodiment of a curved display device, where a display substrate and an opposing substrate coupled with each other are curved together to provide a curved form, and thus miss-alignment may occur, by adjusting a pre-tilt angle of pre-tilt liquid crystals of each alignment layer of the display substrate and the opposing substrate, the amount of liquid crystal molecules aligned in opposite directions may be reduced in response to an electric field in an area where the miss-alignment occurs. Accordingly, in such an embodiment, where the amount of the liquid crystal molecules aligned in the opposite directions is increased, the display quality of the curved display device may be effectively prevented from being deteriorated.

The above-disclosed subject matter is to be considered illustrative and not restrictive, and the appended claims are intended to cover all such modifications, enhancements, and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A curved display device comprising:
    a display substrate curved substantially along a first direction;
    an opposing substrate coupled with the display substrate and curved together with the display substrate; and
    a liquid crystal layer comprising liquid crystal molecules and interposed between the display substrate and the opposing substrate,
    wherein the opposing substrate comprises:
        a common electrode; and
        a first alignment layer disposed on the common electrode and which aligns a first portion of the liquid crystal molecules at a first pre-tilt angle, and
    wherein the display substrate comprises:
        a pixel electrode disposed in each of a plurality of pixel areas, wherein a slit is defined in the pixel electrode;
        a second alignment layer disposed on the pixel electrode and which aligns a second portion of the liquid crystal molecules at a second pre-tilt angle, which is greater than the first pre-tilt angle;
        a base substrate, on which the plurality of pixel areas are defined; and
        a first protrusion part comprising an insulating material that absorbs light and being disposed between the base substrate and the pixel electrode to reduce a separation distance between the pixel electrode and the common electrode, the first protrusion part extending in a second direction crossing the first direction, and
    wherein a plurality of domains are defined in each of the plurality of pixel areas, and at least two domains of the plurality of domains are arrayed along the first direction, the first protrusion part crosses between the two domains, and
    wherein the slit is defined in a third direction and a fourth direction tilted from the first direction in the at least two domains, and the second direction, the third direction and the fourth direction are different from each other.

2. The device of claim 1, wherein
    the first alignment layer comprises a material which fixes and aligns the liquid crystal molecules at the first alignment layer, and
    the second alignment layer comprises a material which fixes and aligns the liquid crystal molecules at the second alignment layer.

3. The device of claim 2, wherein
    the first alignment layer comprises a first reactive mesogen, which is coupled with the liquid crystal molecules and aligns the liquid crystal molecules at the first pre-tilt angle; and
    the second alignment layer comprises a second reactive mesogen, which is coupled with the liquid crystal molecules and aligns the liquid crystal molecules at the second pre-tilt angle.

4. The device of claim 3, wherein an amount of the second reactive mesogen is greater than an amount of the first reactive mesogen.

5. The device of claim 1, wherein the first pre-tilt angle is less than about 0.4 degrees.

6. The device of claim 5, wherein a difference between the second pre-tilt angle and the first pre-tilt angle is in a range of about 0.4 degree to about 1.2 degrees.

7. The device of claim 1, wherein
the slit is defined in the third direction and the fourth direction such that a plurality of domains are defined in each of the plurality of pixel areas; and
liquid crystal alignment directions, in which the liquid crystal molecules are aligned in response to an electric field generated between the pixel electrode and the common electrode, are different from each other in the plurality of domains.

8. The device of claim 7, wherein
the plurality of domains comprise a first domain, a second domain, a third domain and a fourth domain,
the first and second domains are adjacent to each other in the first direction,
the third and fourth domains are adjacent to each other in the first direction,
the first and third domains are adjacent to each other in the second direction, and
the second and fourth domains are adjacent to each other in the second direction.

9. The device of claim 8, wherein the pixel electrode comprises:
a horizontal branch part which extends substantially in the first direction;
a vertical branch part which extends substantially in the second direction to be connected to the horizontal branch part;
first branch parts branched from the horizontal branch part or the vertical branch part to be disposed in the first domain and which extends in a direction tilted from the first and second directions;
second branch parts branched from the horizontal branch part or the vertical branch part to be disposed in the second domain and which extends in a direction tilted from the first and second directions;
third branch parts branched from the horizontal branch part or the vertical branch part to be disposed in the third domain and which extends in a direction tilted from the first and second directions; and
fourth branch parts branched from the horizontal branch part or the vertical branch part to be disposed in the fourth domain and which extends in a direction tilted from the first and second directions.

10. The device of claim 1, wherein
a display area, on which an image is displayed, is defined on the display substrate, and
the display area has a curved form curved along the first direction.

11. The device of claim 1, wherein the second alignment layer aligns the liquid crystal molecules corresponding to the first protrusion part at the second pre-tilt angle.

12. The device of claim 11, wherein the pixel electrode comprises:
a horizontal branch part which extends substantially in the first direction;
a vertical branch part which extends substantially in a second direction crossing the first direction to be connected to the horizontal branch part; and
branch parts branched from the horizontal branch part or the vertical branch part and which extends substantially in a direction tilted from the first and second directions,
wherein the first protrusion part extends substantially in the second direction to overlap the vertical branch part.

13. The device of claim 12, wherein
the first protrusion part comprises a tilted side tilted with respect to the base substrate, and
liquid crystal molecules disposed on the tilted side among the liquid crystal molecules are pre-tilted at the second pre-tilt angle toward an uppermost side of the first protrusion part.

14. The device of claim 1, wherein the display substrate further comprises:
a second protrusion part comprising an insulating material and disposed on the pixel electrode to overlap an edge substantially in parallel to the second direction of the pixel electrode.

15. The device of claim 14, wherein
the second protrusion part comprises a tilted side tilted with respect to the base substrate, and
liquid crystal molecules disposed on the tilted side among the liquid crystal molecules are pre-tilted at the second pre-tilt angle toward a lower side of the tilted side.

* * * * *